(12) United States Patent
Roby (10) Patent No.: US 8,807,313 B2
(45) Date of Patent: Aug. 19, 2014

(54) FAN DRIVE SYSTEM WITH SENSOR FEEDBACK

(75) Inventor: Joshua L. Roby, Battle Creek, MI (US)

(73) Assignee: BorgWarner Inc., Auburn Hills, MI (US)

(*) Notice: Subject to any disclaimer, the term of this patent is extended or adjusted under 35 U.S.C. 154(b) by 239 days.

(21) Appl. No.: 13/130,126

(22) PCT Filed: Nov. 13, 2009

(86) PCT No.: PCT/US2009/064326
§ 371 (c)(1),
(2), (4) Date: Nov. 7, 2011

(87) PCT Pub. No.: WO2010/059510
PCT Pub. Date: May 27, 2010

(65) Prior Publication Data
US 2012/0107145 A1 May 3, 2012

Related U.S. Application Data

(60) Provisional application No. 61/117,199, filed on Nov. 23, 2008.

(51) Int. Cl.
*F16D 31/00* (2006.01)
*F16D 25/08* (2006.01)
*F16D 43/28* (2006.01)

(52) U.S. Cl.
USPC .............. 192/58.62; 192/58.61; 192/85.53; 417/319

(58) Field of Classification Search
USPC ......... 417/223, 319; 192/58.61, 58.62, 58.63, 192/58.42, 85.49, 85.53
See application file for complete search history.

(56) References Cited

U.S. PATENT DOCUMENTS

| | | | |
|---|---|---|---|
| 5,560,462 A * | 10/1996 | Gustin | 192/58.42 |
| 5,947,247 A * | 9/1999 | Cummings, III | 192/70.12 |
| 6,013,003 A | 1/2000 | Boffelli et al. | |
| 7,047,911 B2 | 5/2006 | Robb et al. | |
| 7,178,656 B2 | 2/2007 | Pickelman et al. | |
| 7,249,644 B2 | 7/2007 | Honda et al. | |
| 7,980,373 B2 * | 7/2011 | Boyer | 192/58.61 |
| 2002/0005328 A1 | 1/2002 | Heinle et al. | |
| 2006/0096831 A1 | 5/2006 | Settineri | |
| 2006/0201771 A1 | 9/2006 | Ignatovich et al. | |
| 2007/0023253 A1 | 2/2007 | Wayman | |
| 2008/0023288 A1 * | 1/2008 | Boyer | 192/58.61 |
| 2011/0229323 A1 * | 9/2011 | Roby | 416/169 R |

* cited by examiner

*Primary Examiner* — Peter J Bertheaud (57) ABSTRACT

Hydraulic fan drive system with sensor feed-back. A sensor positioned in the central shaft of the fan drive assembly provides speed feedback signals and eliminates the need for routing the sensor wires.

9 Claims, 8 Drawing Sheets

FAN DRIVE SYSTEM WITH SENSOR FEEDBACK

CROSS-REFERENCE TO RELATED APPLICATIONS

This application is related to U.S. Patent Application Ser. No. 61/117,197 entitled Fan Drive System With Oil Pressure Control and U.S. patent application Ser. No. 61/117,201, entitled Fan Drive System With Lubrication Flow System, both filed on the same day as the present application.

TECHNICAL FIELD

The present invention relates generally to fan drive systems and more particularly to wet friction fan drive systems with sensor feedback.

BACKGROUND OF THE INVENTION

The invention relates generally to fan drive systems and more particularly to hydraulic and wet friction-type clutches for fan drive systems. There are various types of friction coupling devices and fluid coupling devices used to drive various devices or systems, such as radiator cooling fans for internal combustion engines. These friction clutch devices generally include dry friction clutch assemblies, viscous drive clutch assemblies, and wet friction clutch assemblies. Dry friction clutch assemblies have only two stages of operation: fully engaged or fully disengaged. Dry friction clutch assemblies also generally have low thermal capacity since they typically do not incorporate fluid flow cooling mechanisms. Viscous drive clutch assemblies have the ability to engage at higher engine speeds and can have varying degrees of engagement. Viscous drives are never fully engaged for internal viscous sheer purposes.

Viscous drives slip to some degree at all times, making them incapable of turning at fully engaged peak operating speeds or at higher speeds than originally designed. Viscous drives are further limited in that the more engine cooling that is needed, the larger and more costly the viscous drive and cooling fan that are required.

Wet friction clutches are popular particularly for their use in situations involving severe service where the fan drives are in constant service and carry a constant load. Wet friction systems have the advantage of a friction clutch assembly as well as the ability to provide increased engine cooling.

Wet friction fan drive assemblies are shown, for example, in U.S. Pat. Nos. 7,047,911, 7,249,664 and 7,178,656. These systems utilize hydraulically controlled fan drives with certain methods of engagement. The hydraulic systems include a housing assembly containing a hydraulic fluid and an engaging circuit. The engaging circuit includes a pitot tube coupled within the housing assembly that receives at least a portion of the hydraulic fluid. An energizing circuit engages the housing assembly to a fan shaft in response to supplying the hydraulic fluid from the pitot tube.

Although these wet friction clutch systems described above provide improved fan drive control systems and assemblies, particularly as to the engagement pressure and control, as well as the removal of internally generated heat, it is an object of the present invention to provide a further improved assembly and system.

SUMMARY OF THE INVENTION

The present invention provides improved methods for controlling the pressure applied to the clutch pack of a fan drive system and consequent engagement of the wet friction clutch. In one embodiment, the wet friction clutch system is controlled when it is desirable to modulate the fan speed independent from the engine speed. This embodiment also provides closed loop feedback on fan speed for optimal control. A microprocessor based three-way valve is utilized for modulating the oil pressure.

In another embodiment of the invention, a unique sensor is provided in the central shaft eliminating the need for routing sensor wires. The sensor provides speed feedback signals in the clutch system. This embodiment also simplifies the assembly of the device.

Another embodiment of the present invention has particular applicability for cooling a wet friction clutch system when it is operating continuously in a high slip region.

Applications in which the wet friction clutches operate under continuous high slip conditions are known as "severe service" applications. In order to remove the substantial heat which is generated internally in these wet friction clutches. the clutch lubrication oil is circulated from the clutch through a heat exchanger and then brought back in a cooled condition. A modular valve mechanism is provided with coaxial oil passages for transporting lubrication oil to and from the wet friction clutch. A coaxial lubrication oil path is utilized for both the outgoing and incoming oil lines around the control valve.

These objects, purposes, benefits and details of embodiments of the present invention, as well as other aspects and features of the invention, will become apparent from the following description of the invention when taken in view of the attached drawings and appended claims

DETAILED DESCRIPTION OF THE PREFERRED EMBODIMENT

In the following Figures, the same reference numerals will be used to refer to the same components. While the present invention is described with respect to a method and system for a hydraulically controlled fan drive system, the present invention may be adapted and applied to various systems including vehicle systems, cooling systems, fan drive systems, friction drive systems, or other systems that would be obvious to persons of ordinary skill in the art.

In the following description, various operating parameters and components are described for one constructed embodiment of the invention. The specific parameters and components are included only as examples and are not meant to be limiting. The invention has application in both vehicle and non-vehicle environments. Non-vehicle applications include generator sets, pumping stations and the like. Also, in the following description, various fan drive components and assemblies are described only as an illustrative example. The fan drive components and assemblies may be modified depending upon the application in accordance with the abilities and knowledge of persons of ordinary skill in the art.

Figure 1:
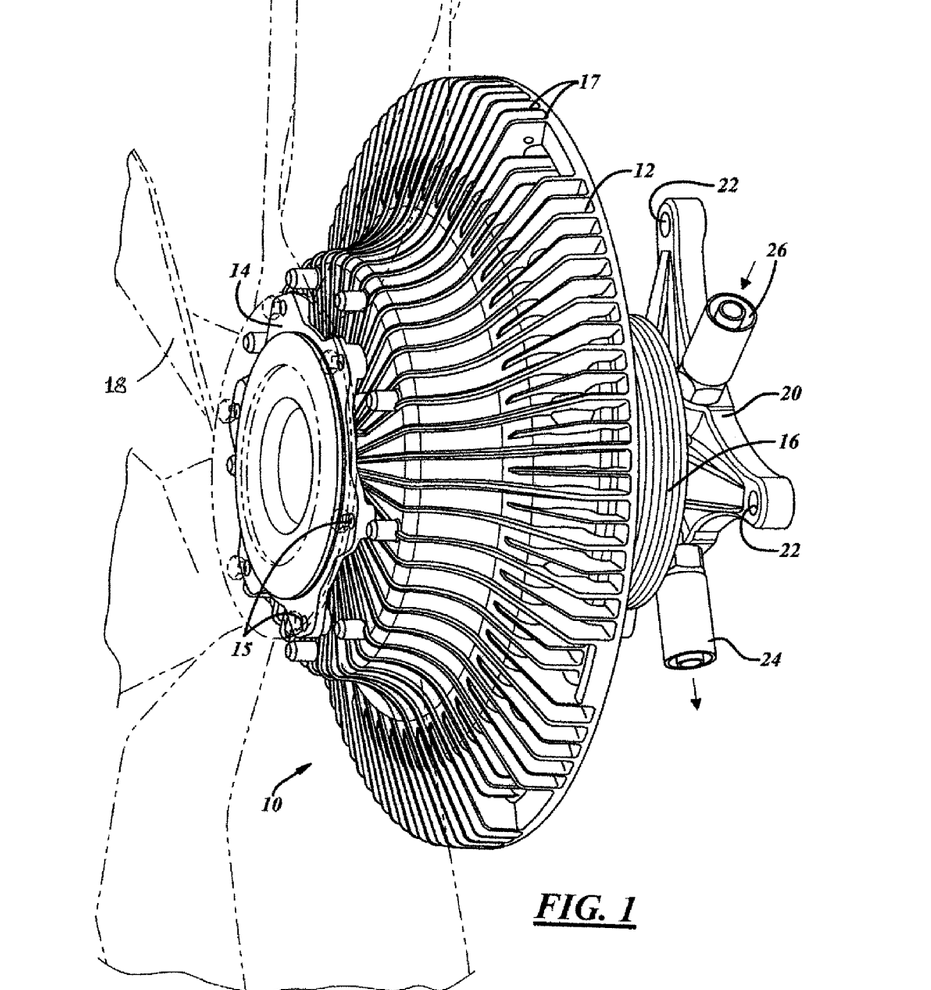
FIG. 1 is a prospective view of a wet friction clutch assembly in accordance with an embodiment of the present invention.

FIG. 1 illustrates a wet friction fan clutch assembly 10 in accordance with a preferred embodiment of the present invention. The assembly includes the housing member 12 which has a fan mounting plate 14 on one side and a drive pulley 16 on the other side. Openings 15 are provided for fastening a fan 18 to the mounting plate 14. The pulley 16 is an input pulley and is a part of a fan drive system which is driven by a belt that is in operable connection with the engine, preferably of a vehicle. Torque from the input pulley 16 is translated through the clutch assembly 10 to the fan mounted on the mounting plate 14. The speed of the fan 18 is controlled by the clutch assembly 10, and the fan is used to provide cooling as needed.

The wet friction clutch assembly 10 is mounted on a stationary base member 20. The base member 20 is adapted to be mounted on a vehicle or engine block of a vehicle as known in the art. For this purpose, mounting holes 22 are provided.

As described in more detail below, lubrication oil is circulated through the mounting shaft on which the wet friction clutch assembly is mounted in order to cool the assembly. For this purpose, an outflow oil fitting 24 and an inflow oil fitting 26 are provided. Hot lubrication oil is passed through the oil fitting 24 to an external heat exchanger 23 which cools the lubrication oil. The cooled oil is then circulated back into the clutch assembly through the input oil fitting 26.

As shown in FIG. 1 and as known in the art, the housing is preferably made from a metal material, such as aluminum or magnesium, and contains a plurality of fin members 17 which are used to dissipate heat to the atmosphere and thus help cool the clutch assembly 10. The housing member 12 is fixedly connected to the input pulley 16 and thus rotates at the same speed as the pulley, namely the input speed to the fan drive assembly.

As indicated, the fan mounting plate 14 and thus the bladed fan member attached to the plate are operated by the wet friction clutch assembly in order to rotate and provide cooling as needed. In severe service applications, the fan member is typically continuously spinning or operating in some manner. This provides constant slippage of the clutch mechanism and thus the constant generation of heat that needs to be dissipated. Without dissipating the heat, the life and durability of the clutch mechanism would be significantly reduced.

Figure 2:
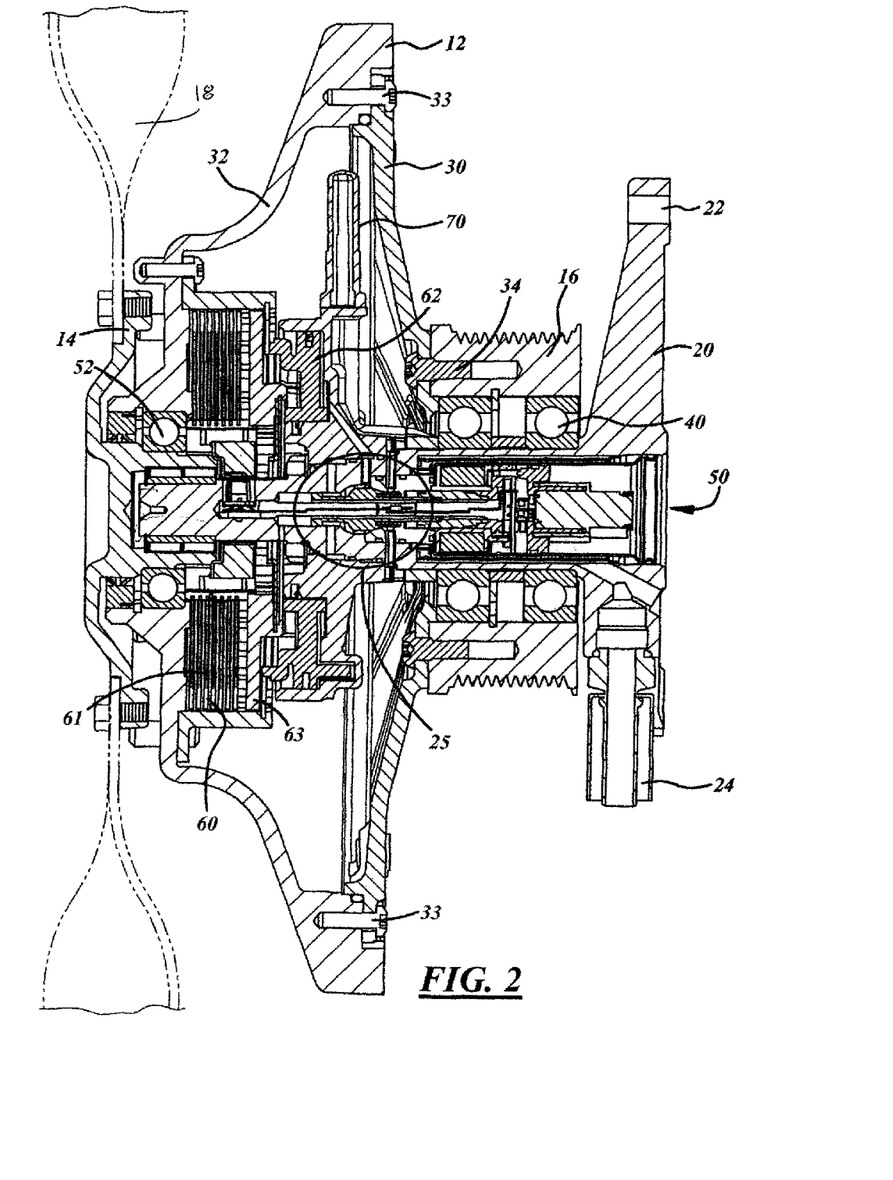
FIG. 2 is a cross-section of the wet friction clutch assembly as shown in FIG. 1.

FIG. 2 is a cross-sectional view of the wet friction fan drive assembly 10 as shown in FIG. 1. The cross-sectional view illustrates the details of the fan drive assembly itself, as well as a preferred embodiment of the integrated three-way control valve mechanism 25 in accordance with the present invention.

The wet friction fan drive assembly is a hydraulically controlled fan drive system which uses rotational energy from the vehicle engine, which is preferably a liquid cooled engine, at an increased ratio to turn the cooling fan, which is attached to the fan plate 14, to provide air flow through a radiator. The housing member or assembly 12 is fixed to the pulley which is coupled to and rotates relative to a crankshaft (not shown) of the engine with a fan belt used typically within an engine compartment of a vehicle. Of course, as mentioned above, the present invention may be relatively operative in relation to various components and via any number of belts or other coupling devices, such as a timing chain.

Key features of the present invention include a wet friction fan drive system with a unique fan speed sensor, a unique hydraulic valve design that enables electrical signals from the fan speed sensor to pass through the center of the valve body, and a unique lubrication system used to cool the fan drive assembly. The lubrication system passes lubrication oil concentrically around the housing of the valve body. In accordance with a preferred embodiment of the invention, the valve design is independent of the clutch shaft subassembly and can be used in an infinite number of permutations of the base shaft design.

The basic operation of the wet friction clutch is described in U.S. Pat. Nos. 7,047,911, 7,249,664 and 7,178,656 the disclosure of which are hereby incorporated herein by reference. In general (as shown in FIG. 2), the housing member 12 includes a body member 30 and a cover member 32 which are securely affixed together, such as by bolts 33 or other fasteners. The body member 30 is also securely affixed to the input pulley 16, such as by fasteners 34, and both rotate at the same speed. The input pulley 16 is attached by bearing members 40 to the base member 20 as shown. The base member 20 includes a central shaft member 50 which includes the integrated controller for a valve mechanism as described below. The fan plate member 14 is mounted in the housing member 12 by bearing member 52 and is only activated and rotated when the clutch mechanism is activated. In this regard, the clutch mechanism 60 includes a plurality of clutch plates as shown in FIG. 2 and is activated by a clutch piston member 62. When the piston member 62 is activated, the friction clutch mechanism 60 translates the rotational energy of the housing member 12 to the fan plate member 14 and thus rotates the fan.

The housing 12 includes a fluid reservoir for storing and retaining the hydraulic fluid. A piston mechanism has a pitot tube 70 that is coupled to the piston housing assembly and receives a portion of the hydraulic fluid.

The clutch mechanism 60 includes a clutch pack 61 and a drum housing 63 as known in the art. The clutch pack 61 includes multiple clutch plates which are coupled to the drum housing 63 and a second series of clutch plates that are coupled to the shaft and to the fan plate 14. Any number of clutch plates may be used and may vary from one to several clutch plates depending on the desired engagement effect and depending upon space limitations. A control circuit controls operation of the piston and its engagements to the piston mechanism.

Figure 3:
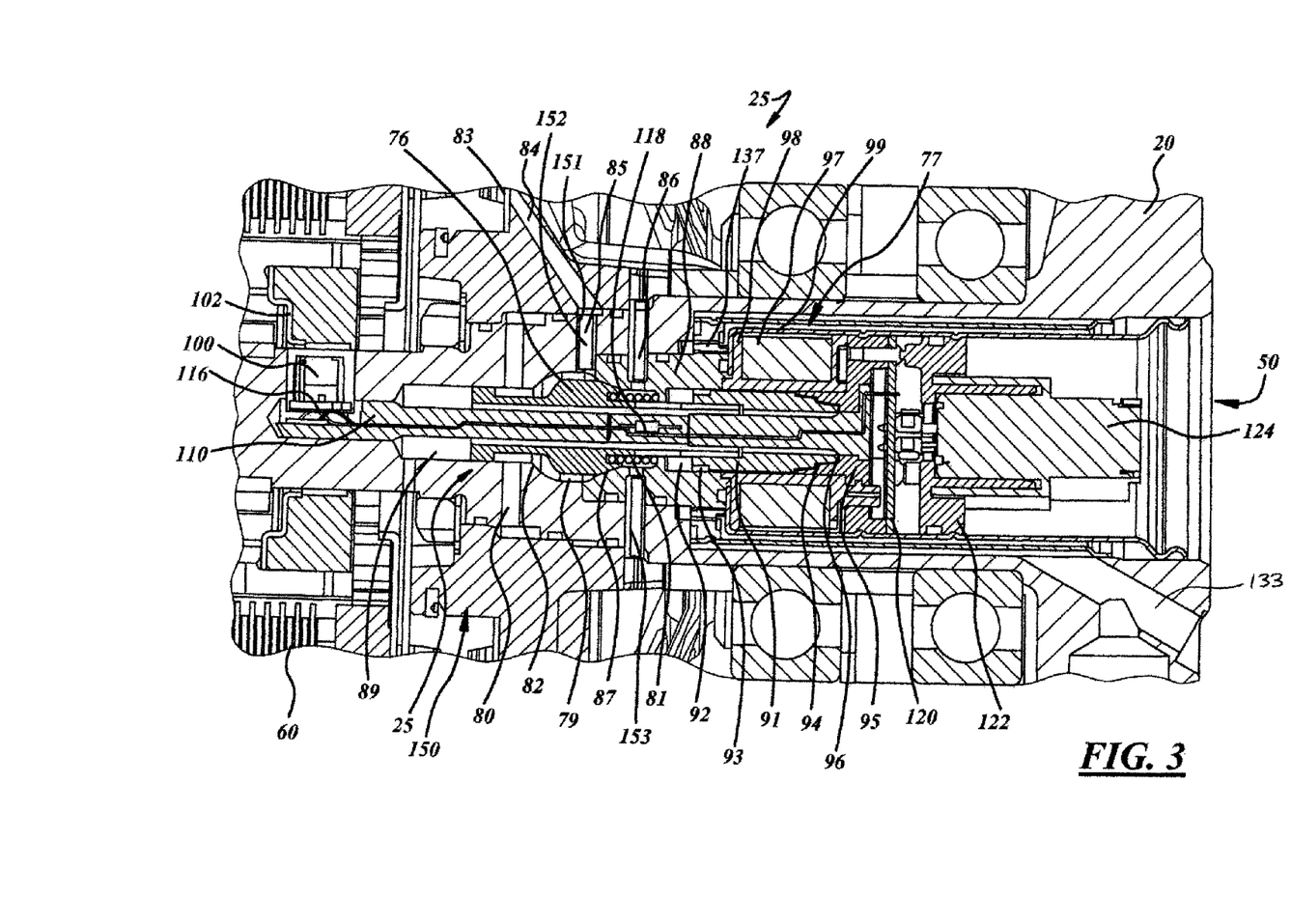
FIG. 3 is a prospective view of a modular coaxial valve design in accordance with an embodiment of the present invention.

The hydraulic fluid after entering the drum housing passes across and cools the friction plates and then returns to the fluid reservoir. A more detailed view of the modular co-axial valve mechanism 25 of the preferred embodiment in accordance with the present invention is shown in FIG. 3. The valve mechanism 25 performs several functions, it controls the hydraulic pressure supplied to the clutch piston 62, provides passages for the flow of lubrication oil, and houses the clutch control circuit board and sensor interconnection mechanism.

The hydraulic pressure applied to the clutch piston 62 is controlled by modulating the position of the valve plunger 76 through the solenoid motor 77. The hydraulic pressure is developed in the pitot tube 70 and then routed into the valve area 79 through shaft entry ports 80. When the solenoid motor 77 is deenergized, the valve return spring 81 pushes the valve plunger 76 back against the forward valve seat 82. In this position, the valve closes off the pressure supplied from the pitot tube 70 and allows any pressure in the pressure chamber 83 to vent back through the piston housing supply passage 84, the shaft pressure port 85 and the valve head valve ports 86.

The pressure vents back through these passages and ports to the oil sump inside the clutch housing.

When the solenoid motor 77 is energized, it pulls the valve plunger 76 against the valve return spring 81 and throttles the oil flow through the conical flow regulation passage 87 between the valve plunger 76 and the valve head 88. Since the flow area through the flow regulation passage 87 is a function of the position of the valve plunger 76, the pressure drop through the flow regulation passage 87 and subsequent pressure developed at the shaft pressure port 85 can be regulated by controlling the position of the valve plunger 76.

The valve plunger 76 is supported on one end by a radial bearing surface between the valve plunger 76 and a pilot bore 89 in the mounting shaft 50. The opposite end of the valve plunger 76 is pressed into a solenoid armature 91 which is radially supported by the pilot bore 92 and the valve head 88 via a non-magnetic bushing 93. The solenoid armature 91 further incorporates a stepped conical reluctance gap 94 that helps to linearize the force versus displacement curve of the solenoid motor 77. Magnetic stiction is prevented between the solenoid armature 91 and the rear solenoid pole 95 by a non-magnetic washer 96.

The solenoid motor 77 consists of a coil 97 that is wound around a bobbin 98 that develops a magnetic field in the stepped conical reluctance gap 94 in order to generate a force. A magnetic circuit for the solenoid motor is completed with a flux can 99 that is mechanically connected to the valve head 88 and the rear solenoid pole 95.

Figures 7, 8, 9:
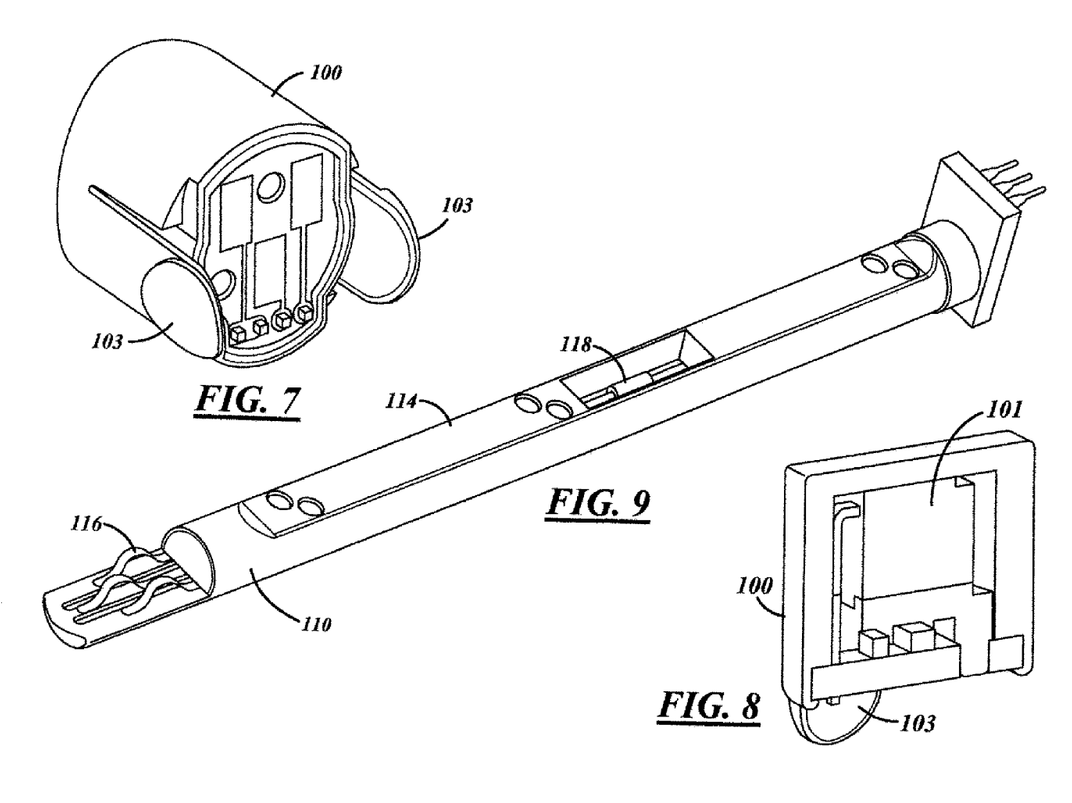
FIG. 7 illustrates a fan speed sensor module in accordance with the present invention.
FIG. 8 is a cross-section of the fan speed sensor module as shown in FIG. 7.
FIG. 9 illustrates an overmolded lead frame assembly in accordance with an embodiment of the present invention.

In one embodiment of the invention, the speed of the fan is detected by fan speed sensor module 100. The module 100 is also shown in FIGS. 7 and 8. Module 100 houses a back—biased Hall-effect gear tooth sensor 101 that senses the passing of the teeth on the fan speed target ring 102. The sensor module 100 is a modular sub-assembly that is connected to the side of the mounting shaft 110 and is retained with retaining ear members 103 (as shown in FIGS. 7 and 8).

Figure 11:
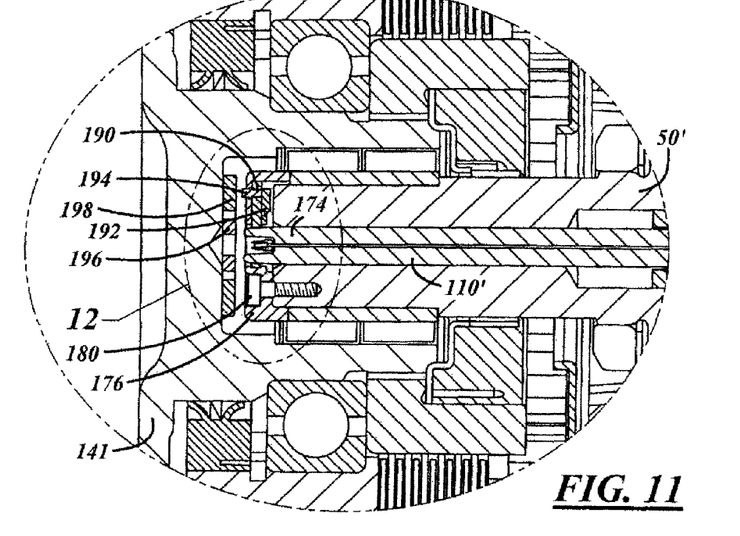
FIG. 11 illustrates an alternate fan speed sensor embodiment.
Figure 12:
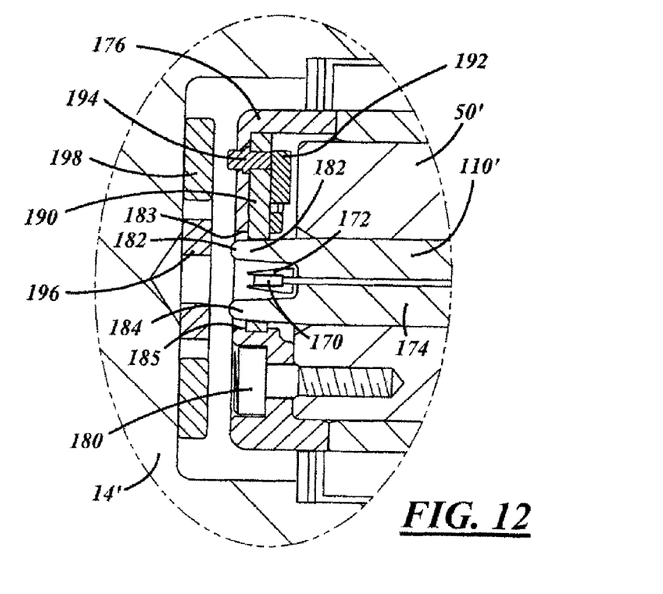
FIG. 12 is an enlarged view of circled portion 12 in FIG. 11.

The sensor module 100 makes electrical contact with the co-axial electrical lead frame assembly 114 through a set of spring contact members 116. This is also shown in FIG. 9. The electrical lead frame assembly 114 further connects the fan speed sensor electrically to the valve control printed circuit board 120 (FIG. 3). The sensor module can also be positioned at the end of the frame assembly as shown in FIGS. 11 and 12. The lead frame assembly 114 also incorporates a thermistor 118 for directly measuring the temperature of the fluid within the clutch mechanism, such as hydraulic oil or automatic transmission fluid (ATF). The thermistor 118 is connected across the fan speed sensor ground and output in a way to superimpose the fan speed sensor output and the thermistor temperature on the same signal line.

The valve control printed circuit board 120 is hermetically sealed from the environment through an O-ring sealed electrical end cap member 122. This is shown in FIG. 3. The end cap member 122 further meets with a sealed electrical connector 124 which connects the clutch to the vehicle wiring harness. This configuration allows for a PCB mounted connector header which minimizes the complexity of the vehicle wiring harness electrical connection and provides a robust electrical interconnection.

An alternate embodiment of a fan speed sensor system is shown in FIGS. 11 and 12. An electrical contact 170 at the end of the electrical lead frame member 110' is positioned in receptacle 172 which is mounted in the printed circuit board 190. The receptacle 172 holds the electrical contact 170 with a plurality of spring finger members which allows compensation for thermal expansion and contraction of the lead frame member and other components. A cap member 176 is positioned over the end of the central shaft member 50'. The cap member 176 is secured in place by a plurality of screws 180 or other fastener members. Projecting members 182 and 184 extend from the end of the electrical lead frame member 110' and are positioned in corresponding openings 183 and 185, respectively, in the printed circuit board member 190.

A printed circuit board 190 is preferably molded into the cap member 176. The circuit board 190 is connected to the electrical contact 170. A surface mount Hall Effect Device 192 is positioned on the circuit board 190, along with a flux concentrator 194.

A magnetic ring 196 with alternating N and S members is molded or bonded into member 198 which in turn is connected or fastened to the fan mounting plate 141. In this manner, when the fan is caused to rotate by the valve mechanism, the speed of the fan is sensed and determined by the Hall Effect Device 192.

Figure 4:
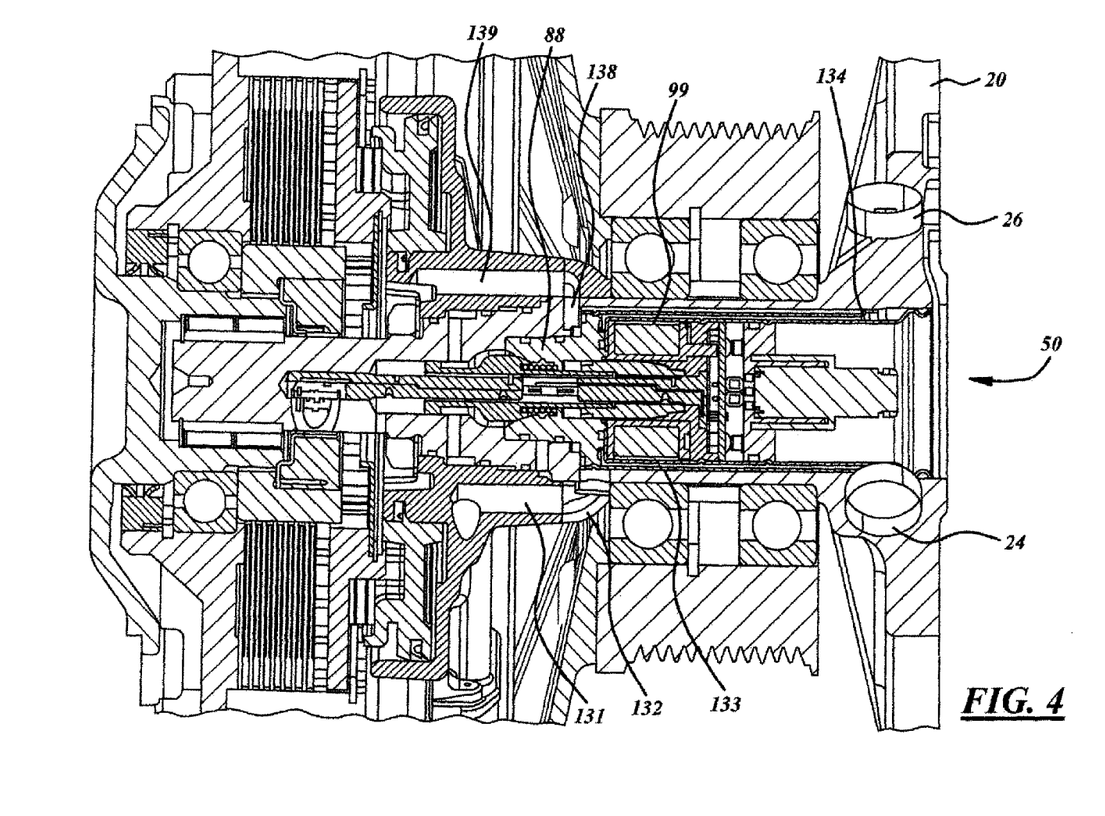
FIG. 4 illustrates the lubrication flow communication paths in accordance with an embodiment of the present invention.
Figure 5:
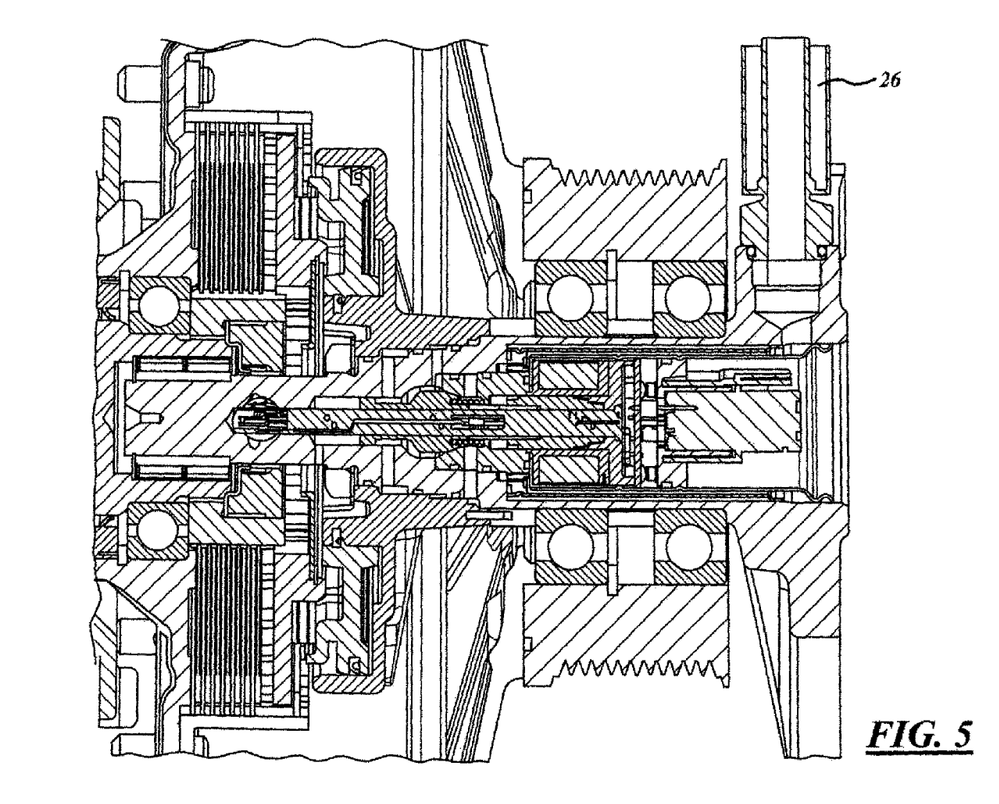
FIG. 5 illustrates the lubrication oil passageways in accordance with an embodiment of the present invention.

In accordance with a preferred embodiment of the present invention, the clutch lubrication oil supply is routed out of the fan drive, through a heat exchanger, and then back into the fan drive. In the present embodiment, lubrication oil flow is developed through the stationary pitot tube 70. As better shown in FIG. 4, the lubrication oil path is routed through the piston housing hot oil path 131 through the piston housing spacer member 132, through a hole in the mounting shaft 50 and into the hot oil passage 133. The hot oil passage 133 is created between the inner diameter of the mounting shaft 50 and the outer lube tube 134. From hot oil passage 133, the hot ATF flows out of the clutch assembly through the hot oil exit port 24 in the mounting base member 20. After the hot oil has been removed from the fan drive assembly, it is plumbed externally through a heat exchanger where it is cooled before it is recirculated to the inlet oil return port 26.

After the cooled oil enters the inlet port 26, it flows concentrically between the outer lube tube 134 and the flux can 99. Once the cooled oil reaches the valve head 88, it flows through the valve head via valve head passages 137 (FIG. 3). The cooled oil then flows through a cold oil port 138 in the mounting shaft 50, back through the piston housing spacer member 132 and through the piston housing cold oil passage 139 back into the friction plates in the clutch mechanism 60.

Figures 6, 10:
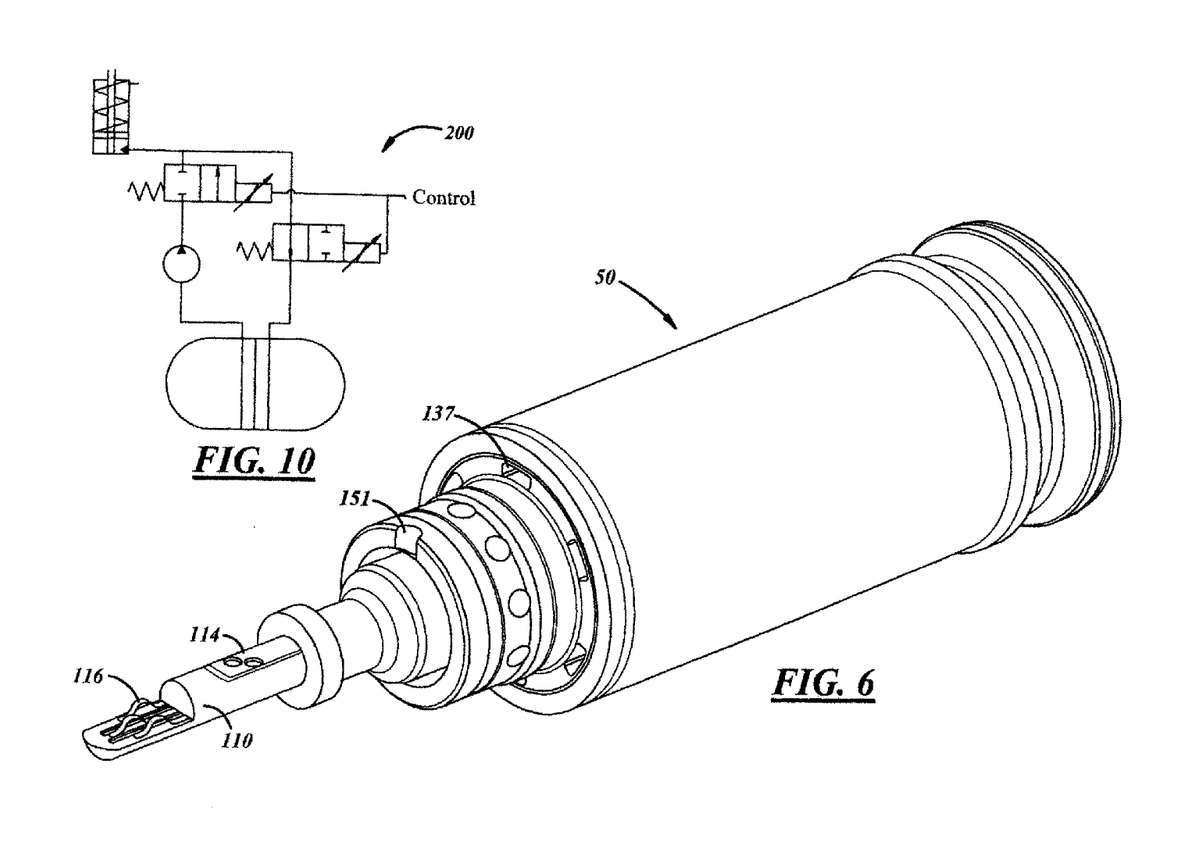
FIG. 6 illustrates a control valve subassembly in accordance with the present invention.
FIG. 10 illustrates a three-way valve circuit in accordance with an embodiment of the present invention.

The control valve subassembly 150 also includes an orientation notch 151 (FIGS. 3 and 6) that mates with a spring pin member 152 to insure proper angular orientation of the control valve subassembly 150 within the mounting shaft 50. The subassembly 150 is retained within the mounting shaft 50 by two spring pin members 153 that press into the valve head ports 86.

Some known hydraulic valve assemblies used to control pressure in wet friction fan clutches are two-way poppet designs. These regulate the flow restriction between the clutch pack actuation piston and the hydraulic sump. Since the pressure applied to the piston varies with the square of input speed, larger flow passages are required through the valve to prevent the clutch from self-energizing at high input speeds due to flow restriction through the vent path. In contrast, the present invention utilizes a valve design 200 (FIG. 10) in which the valve modulates flow between the piston and the vent and enables the use of smaller oil passages and allows the fan clutch to achieve lower disengaged speeds for energy conversion. This also allows for substantially infinite control of said fan speed between its minimum and maximum rotational speed conditions—i.e. fully disengaged, fully engaged, and infinitely in between.

The hydraulic valve mechanism is a normally closed valve design. This means that when the electrical power is lost, the clutch will completely disengage. This feature accommodates many future fan clutch applications that will use high pulley ratios to drive the clutch, the clutch ratios being greater than 1.4:1. With high pulley ratios at this level, the fan torque at high engine speeds if the valve were to fully engage when electrical power was lost, would exceed the rating of the engine accessory drive. Furthermore, if the valve were to fully engage the clutch when electrical power is lost, the fan torque at high engine speeds would exceed the rating of the engine accessory drive. With the clutch mechanism disengaging when electrical power is removed, there is no need to engage the cooling fan at all during much of the vehicle drive cycle. Under these conditions, the present invention will conserve electrical energy.

Another advantage of the embodiment shown herein of the present invention relates to the routing, of the wires to the speed sensor. Since the control valve utilizes most of the interior space of the shaft member, it is difficult to route the speed sensor wires around the valve. With the embodiment of the present invention as shown in the drawings, the sensor wires are routed through the center of the valve, rather than around it, which eliminates complex wire routing paths. In addition, the spring contact system for making electrical contact between the fan speed sensor subassembly and the valve assembly simplifies the final assembly.

With the present invention, an onboard microcontroller performs all of the necessary control functions. With this method, only four control wires are required (CAN+, CAN−, +Vbattery, −Vbattery). None of these control wires need to be connected directly to the Engine Control Unit ("ECU"), which frees connector pins for the original equipment manufacturers ("OEMs") to use for other functions.

With other known systems, typically five pins are available for the fan drive control. However, when fan speed feedback is added to the system, five pins are not sufficient to provide all of the control functionality desired. For example, to achieve the desired control, seven wires would be required (Coil+, Coil−, Thermal Switch+, Thermal Switch−, Fan Speed Output, +5 VDC, and Gnd). The use of a thermistor 118 in the present invention also reduces noise and energy consumption. Known heavy duty multi-speed control systems ("HDMS") use a thermal switch to measure the ATF temperature in the clutch and send back signals to the vehicle ECU when a temperature limit is reached. The ECU then typically will fully engage the clutch in order to eliminate the slip heat generation and allow the ATF to cool. This strategy, however, represents a significant amount of wasted energy required to turn the fan at high speeds when it is not required for engine cooling. It also could develop a high level of undesirable noise. In contrast, with the present invention, the use of a thermistor to measure the ATF temperature in conjunction with the microcontroller, implements a more sophisticated slip heat protection strategy.

In addition, the onboard microcontroller also makes it easier for the HDMS fan clutch to be applied on applications where the ECUs do not have pulse width modulation ("PWM") drivers capable of driving the control valve solenoid coil, or where the OEMs do not have the engineering resources available to implement new control logic for operating the fan clutch.

The embodiment of the present invention described herein also seals the electronics from moisture entry under the extreme thermal cycling and environmental conditions which are typical of motor vehicle applications. An electrical connector is molded and integrated into the rear cap of the valve subassembly. An O-ring is then used to seal the cap on the outer valve sleeve. The wires are sealed when the mating connector is inserted into the molded connector cap. In addition, the connector cap embodies the connector pin members which are soldered directly to the printed circuit board (PCB) and then protrude through an open hole in the connector cap. Upon final assembly, the electronics cavity is filled with potting compound through the connector cap hole to provide vibration robustness and rigidity for the connector pins.

The present invention also addresses the non-linear force verses displacement curve typical of solenoids. This is accomplished through the stepped armature to the rear flux cap interface in a structure that intentionally increases the magnetic reluctance when the armature nears its fully retracted or naturally highest force position. The present invention is thus able to realize a nearly flat force versus displacement curve over the valve stroke, which typically is four millimeters in length. This significantly improves the open looped controllability of the valve.

While preferred embodiments of the present invention have been shown and described herein, numerous variations and alternative embodiments will occur to those skilled in the art. Accordingly, it is intended that the invention is not limited to the preferred embodiments described herein but instead limited to the terms of the appended claims.

What is claimed is:

1. A wet friction clutch assembly comprising:
   a housing member having a body, a cover, and a central cavity therein;
      a pulley member fixedly coupled to said housing member, wherein said housing member and pulley member both rotate at input speed;
      a stationary base member for mounting said housing member on a surface, said base member having a shaft member positioned in said cavity in said housing member;
      a fan member rotatably attached to said housing member;
      a clutch mechanism positioned in said housing member and adapted to selectively rotate said fan member;
      a valve member for modulating the activating oil pressure utilized to selectively activate the clutch mechanism, said valve member being positioned along the central axis of said shaft member;
      wherein the rotation of said fan member can be controlled between minimum and maximum speeds and at any speed inbetween; and
      a sensor mechanism positioned along the central axis of said shaft member and at least partially inside said valve member; and
      a target ring positioned on said clutch mechanism;
      wherein said rotational speed of said fan member can be ascertained.

2. The wet friction clutch assembly as described in claim 1 wherein said sensor mechanism comprises a Hall-effect sensor.

3. The wet friction clutch assembly as described in claim 1 wherein said sensor mechanism is a modular sub-assembly and is snap fastened onto said shaft member.

4. The wet friction clutch assembly as described in claim 3 wherein said shaft member has retention members for receiving said sensor modular sub-assembly.

5. The wet friction clutch assembly as described in claim 1 further comprising a thermistor coupled to a speed sensor lead frame member, said thermistor utilized for measuring the temperature of said activating oil.

6. The wet friction clutch assembly as described in claim 1 wherein said clutch mechanism is a hydraulic fluid pitot-tube type clutch mechanism.

7. The wet friction clutch assembly as described in claim 1 wherein said sensor mechanism is an overmolded module having a flux concentrator.

8. The wet friction clutch assembly as described in claim 5 wherein said sensor mechanism is a module having spring loaded connector receptacles for being connected to said lead frame member.

9. The wet friction clutch assembly as described in claim 5 wherein said lead frame member comprises an overmolded module.

\* \* \* \* \*